United States Patent [19]

Faulhaber

[11] Patent Number: 5,725,037

[45] Date of Patent: Mar. 10, 1998

[54] MOBILE TOOL STORAGE BOX AND WORK BENCH COMBINATION

[76] Inventor: Kenneth P. Faulhaber, 327 Elm Dr., Casselberry, Fla. 32707

[21] Appl. No.: 719,249

[22] Filed: Sep. 24, 1996

[51] Int. Cl.⁶ .................................................. B25H 1/12
[52] U.S. Cl. .................. 144/285; 144/286.1; 144/287; 206/373; 312/283
[58] Field of Search .................. 144/285, 286.1, 144/286.5, 287; 206/349, 372, 373; 312/257.1, 270.2, 283

[56] References Cited

U.S. PATENT DOCUMENTS

| | | | |
|---|---|---|---|
| 967,783 | 8/1910 | Kellogg | 312/283 |
| 2,944,862 | 7/1960 | Hell | 312/283 |
| 4,055,206 | 10/1977 | Griffin . | |
| 4,338,987 | 7/1982 | Miles . | |
| 4,550,828 | 11/1985 | Baldwin et al. . | |
| 4,725,107 | 2/1988 | Appleton | 312/283 |
| 4,733,703 | 3/1988 | Cimino . | |
| 4,874,025 | 10/1989 | Cleveland | 144/287 |
| 5,148,917 | 9/1992 | LeBrun . | |
| 5,224,531 | 7/1993 | Blohm | 144/287 |

FOREIGN PATENT DOCUMENTS

| | | | |
|---|---|---|---|
| 2575957 | 7/1986 | France | 144/285 |
| 3117512 | 11/1982 | Germany | 144/285 |
| 2244670 | 12/1991 | United Kingdom | 144/285 |
| 2253180 | 9/1992 | United Kingdom | 144/285 |

*Primary Examiner*—W. Donald Bray
*Attorney, Agent, or Firm*—Julian C. Renfro, Esq.

[57] ABSTRACT

A portable workshop having a storage mode as well as an active mode in which working surfaces are presented for use by a craftsman, comprising a front surface in which upper and lower bottom hinged doors are mounted. The workshop has an upper member operatively associated with a rear surface and a pair of end surfaces interconnecting the front and rear surfaces, with this upper member serving with the surfaces to define an enclosed space suitable for the storage of tools. A wheeled base member serves as the support for the front, rear and end surfaces, and interconnecting components are utilized for causing the upper and lower doors to open and close together. The doors, when opened, advantageously reside in a horizontal attitude, with the upper door serving as the principal working surface of the workshop and the lower door serving as a storage location upon which the craftsman utilizing the principal working surface can place small items with which he is working. A sturdy shelf is disposed in approximately an aligned relationship with the upper door when the door is in its open position, thus to make possible an item to be slid from the shelf onto the door for easy access. This shelf divides the interior of the workshop into upper and lower storage locations, and a bottom hinged, laterally extending door is operatively mounted in the rear surface to afford ready access to the lower storage location.

29 Claims, 8 Drawing Sheets

MOBILE TOOL STORAGE BOX AND WORK BENCH COMBINATION

BACKGROUND OF THE INVENTION

The present invention is a multi-function portable workshop, and more particularly is a tool storage box in combination with a work bench. This invention not only provides tool storage safe from thieves, but also provides several highly advantageous work surfaces and is readily portable as well. Along with providing several work surfaces, this tool storage box also provides a means in which other useful tools and devices can be attached to the external surface of the box, which can be employed by craftsmen concerned with residential as well as commercial construction.

In the field of commercial and residential construction, workmen are customarily required to bring a variety of hand tools, and often power tools to the job site. The contractor or subcontractor must provide a secure location for the storage of such tools that is safe from theft.

Depending on the number of men whose tools are to be protected, current steel tool boxes, frequently referred to as "gang boxes," come in various sizes and shapes. Their only function is to store tools. Most gang boxes used today open from the top, where tools are stored on top of one another. This often leads to the necessity of unpacking the entire box in order to retrieve a tool thought to be at the bottom. Then the box must be repacked to safeguard the tools not needed at that particular time. This procedure can involve a substantial waste of time, especially if the tool in question is not there. The more workmen using the gang box for tool storage, the more complicated becomes the problem of packing and unpacking the box.

The Griffin U.S. Pat. No. 4,055,206 entitled "Composite Shop Trailer" teaches a job site radial saw and jointer facility involving a slide out track arrangement upon which the saw is mounted for ready deployment. A rear door of the trailer is opened when the saw is to be moved on its tracks rearwardly from its storage position into its use position. This patentee also utilizes a pair of work material feeder benches that are hingedly pivoted so as to be swung for the rather considerable distance from storage positions along the sides of the device, around into laterally extending positions serving to support a long workpiece when the saw has been moved along its tracks from the storage position into the use position.

Although Griffin mentions the storage of tools, he obviously is principally concerned with the rail arrangement by which the saw can be moved into its use position, and the complex arrangement by which his work material feeder benches can be moved from their storage positions into positions extending across the back of the trailer, in alignment with the table directly associated with the saw. The Griffin device is necessarily expensive, it features no over-under door arrangement, nor is the roof used for the support of ancillary devices.

The Miles U.S. Pat. No. 4,338,987 entitled "Tool Box" involves the combination of a pegboard display with the mobility and security of a locking tool chest, but this patentee teaches side opening doors rather than bottom hinged doors utilized in an over-under relationship. Consequently, his doors provide no working surfaces.

The Cimino U.S. Pat. No. 4,733,703 entitled "Combination Tool Chest/Workbench" likewise teaches no bottom hinged doors that are able to serve as effective work surfaces, and this patentee utilizes drawers for storage of certain items. His device would not appear to be usable as a gang box by a number of workmen, but rather would be more ideally suited for use by a single craftsman.

The LeBrun U.S. Pat. No. 5,148,917 entitled "Multiple Tool Organizing and Storing Carrier" involves a central housing, a pair of opposite side doors, a top lid and a plurality of tool holders. The tool holders are separately supported on the central housing and on the interiors of the doors. The doors of LeBrun, though bottom hinged, are restrained by chains from moving into generally horizontal positions in which they could serve as work surfaces. Furthermore, the LeBrun device is not of a size warranting the utilization of wheels on the underside, so that this carrier could be rolled from place to place.

Most of the known prior art devices are designed for the individual, to meet his personal needs, including tool storage, and not the needs of the whole crew. The gang boxes in use today are simply not designed to effectively accommodate workmen bringing their hand tools in small, hand-held tool boxes, which at present are customarily placed in a generally disorganized fashion in one big gang box supplied by the employer.

It was to overcome the disadvantages of these and other prior art devices that the present invention was designed.

SUMMARY OF THE INVENTION

A portable workshop or gang box in accordance with this invention has a storage mode providing safe tool storage as well as providing a plurality of work surfaces for a carpenter, plumber, electrician or other craftsman. In addition, my novel workshop provides separate storage areas of ample size, thus greatly simplifying the retrieval of tools by different workers.

In accordance with a preferred embodiment, my portable workshop has a storage mode as well as an active mode and comprises a front surface in which upper and lower bottom hinged doors of generally rectangularly-shaped configuration are operatively mounted, with these doors extending laterally for essentially the full width of the workshop. My novel workshop additionally has a rear surface and a pair of end surfaces interconnecting the front and rear surfaces, with an upper member of suitably thick sheet steel operatively associated with upper edges of the front, rear and end surfaces. This upper member serves as a weight bearing roof member and defines with the other surfaces an enclosed space suitable for the storage of tools and the like.

A wheeled base member serves as the support for the front, rear and end surfaces, and interconnecting means are operatively associated with the aforementioned laterally extending upper and lower doors, such that the doors open and close together. Advantageously, I provide means for causing these doors, when opened, to reside in essentially a horizontal attitude, so as to serve as work surfaces for the carpenter or other craftsman. The upper laterally extending door serves as the principal working surface of the workshop, whereas the lower laterally extending door serves as a ready location upon which the craftsman utilizing the principal working surface can conveniently place items with which he is working, such as his nail gun, electric drill, miscellaneous small tools or the like. In this way the principal working surface is able to remain relatively uncluttered.

By the weight-bearing top member being in contact with and supported by the front, rear and end surfaces, the top member forms support means for the mounting of one or more ancillary devices able to be utilized in a highly advantageous manner by the craftsman. It is important to note that the top member serving as the roof member is disposed at an angle to the horizontal and contains thereon a plurality of elongate receptacles of sturdy construction disposed in an essentially parallel relationship. Each of these receptacles is adapted to receive an elongate structural component associated with the support of an ancillary device. Examples of these ancillary devices include the utilization of a worktable of substantial size such that a large blueprint or the like can be opened out and easily read by the craftsman, or the use of at least two support members mounted in widely spaced locations, so as to support hoses, extension cords, or even a number of pieces of pipe or conduit.

As another example of ancillary devices that may be used, I may employ a pair of ladder-like members, one disposed adjacent each end of the upper closure, with the several cross members of each ladder-like member permitting elongate pieces of lumber of several different sizes to be stored in a particularly convenient manner.

Another significant aspect of my invention involves at least one of the side surfaces forming a firm support for an outwardly extending shelf member upon which a relatively heavy component can be supported. Quite conveniently, the shelf member can be readily removable from the side surface, and utilized as a third work table.

It is to be understood that from time to time it is desirable to be able to move my novel workshop from one job site to another, so to that end I provide a plurality of elongate receptacles of sturdy construction secured to the underside of the base member. One pair of elongate receptacles is located in the approximate midpoint of the width of the workshop with the receptacles being disposed in an essentially aligned relationship. Each of the receptacles has a principal aperture, with such aperture of one of the elongate receptacles residing in the direction of the front surface of the workshop, and the aperture of the other of the elongate receptacles residing in the direction of the rear surface of the workshop. As will later be explained in substantial detail, the principal aperture of each of the receptacles is adapted to removably receive an elongate structural component operatively associated with the support of a respective wheel of relatively large diameter. It is intended that a pair of such wheels serve as the support for the workshop during road travel.

With further regard to road travel, it is to be noted that a towbar-receiving receptacle resides in a perpendicular relationship to the pair of elongate receptacles concerned with the mounting of the wheels of relatively large diameter. This towbar-receiving receptacle is adapted to removably receive a towbar to be used in the transport of the workshop when the wheels of relatively large diameter have been installed. Quite advantageously, the towbar is secured in its operative position by the use of a large pin, which can be readily removed at such time as the towbar is no longer needed to be mounted in its operative position.

It should now be apparent that my novel design for a portable workshop enables several different, highly useful ancillary devices to be attached, which are often a necessity at a given job site.

Quite significantly, my novel portable workshop can easily be customized to fit any contractor's or subcontractor's particular needs as well as the needs of an individual consumer, making this invention a highly versatile and efficient gang box/portable workshop.

My novel workshop thus serves a number of separate functions, with a first of such functions being to expedite the morning task of making the tools readily available, and a simplification of the storage of the tools in the evening, so that such ready availability of the tools the following morning becomes a reality.

A second function of my novel workshop is to provide a plurality of work surfaces as well as access to two large tool storage areas. Because the doors utilized on my workshop are hinged at the bottom and extend laterally for substantially the full width of the workshop, these doors form ideal work surfaces for a number of different types of skilled workmen.

A third function of my novel workshop is to provide a means in which a variety of other useful devices, designed to assist in other vital functions, may be readily attached to the external surface of the workshop. Quite advantageously, the ancillary devices may be equipped with elongate structural members designed to be inserted into the sturdy receptacles disposed on the upper closure member, and readily removed after the purpose has been served.

A fourth function of my novel workshop is to assure portability whether the device is open and in use, or else in the storage mode, this portability being assured by the placement of easily installed, relatively large diameter wheels sufficient to permit high speed travel over a road or highway.

It is therefore a principal object of my invention to provide an advantageously configured storage container of relatively inexpensive but yet sturdy construction, which may readily be used for safeguarding expensive tools to be left overnight on a job site.

It is another object of my invention to provide a storage container designed to be manufactured in quantity, which is intended for housing the tools of several different workmen, with this novel container being partitioned in such a way as to enable the retrieval of a certain tool by a particular workman in a minimum of time.

It is yet another object of my invention to provide a sturdy shelf member at an interior location that is disposed at substantially the same elevation in the workshop as the upper laterally extending door, such that a relatively heavy tool such as a chop saw normally stored on the shelf member can be slid out onto the upper door, when this door is in its open position, thus to make the saw or other tool immediately available to the craftsman without any lifting of the saw or other such tool being involved.

It is yet still another object of my invention to provide a work area and tool storage area that is mobile when in use or closed up, and that is readily transported from one job site to another.

It is yet still another object of my invention to provide for a means in which a large variety of tools and other useful devices can be attached and secured to a particular external surface of the workshop.

It is yet still another object of my invention to provide a means for tool storage that is large enough to accommodate a wide variety of tools, as well as small enough to pass through doors that may be only slightly more than two feet in width.

These and other objects, features and advantages of this invention will become more apparent from a study of the appended drawings.

BRIEF DESCRIPTION OF DRAWINGS

FIG. 2 is a perspective view similar to FIG. 1 but showing its laterally extending, bottom-hinged doors in their open positions, and also revealing how tables can be deployed on one end of the device for supporting a compressor, saw or the like;

FIG. 8 is a perspective view of the rear side of my novel portable workshop generally along the lines of FIG. 6, but here showing how sturdy elongate receptacles affixed to the top member can be used for supporting components utilized as mounting means for hoses, extension cords and the like;

FIG. 9 is a perspective view closely along the lines of FIG. 8 but here showing how lumber racks as well as a plan table may be supported on the rear side of my device, with the lumber racks able to be used as mounting means for long boards, tubing and the like;

FIG. 10b is a somewhat enlarged perspective view off a plan table that may be carried on my portable workshop in a stored position, and then deployed in the manner shown in FIG. 9 when a craftsman desires to study a large blueprint or the like;

DETAILED DESCRIPTION

Figure 1:
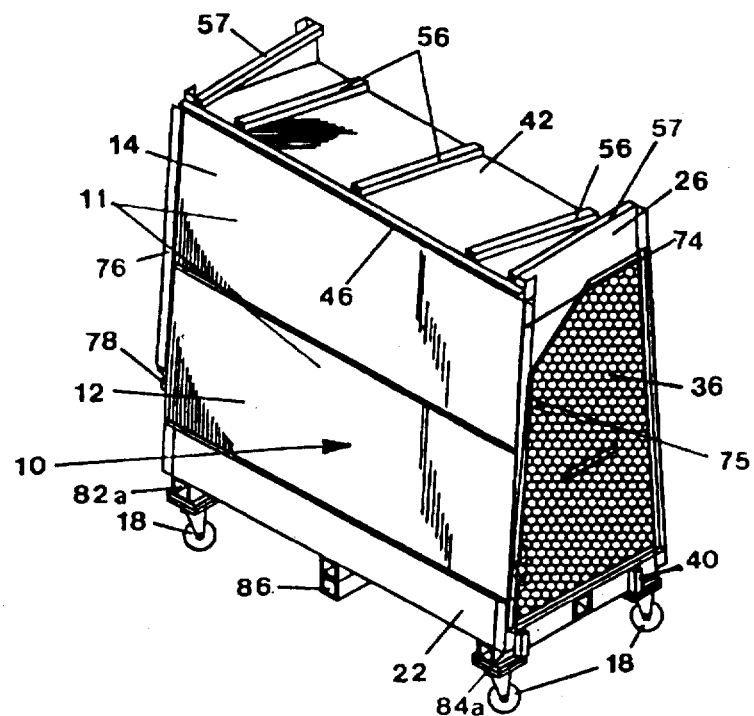
FIG. 1 is a isometric view of my novel portable workshop, with its laterally extending doors shown in the closed position.

In FIG. 1 I have illustrated a preferred embodiment of my novel portable workshop 10, which will be seen to comprise a front surface 11 as well as a pair of end surfaces, with these end surfaces interconnecting with a rear surface. The rear surface and one of the end surfaces are not visible in FIG. 1. These several surfaces are supported from a base member 16, visible in FIG. 3, that extends essentially the full width of the front and rear surfaces so as to form the principal support for these several surfaces.

As will shortly be explained in further detail, the front surface 11 of my portable workshop is principally constituted by laterally extending, bottom hinged doors 12 and 14. The doors are disposed in an over-under arrangement, they extend essentially the full width of my workshop, and they are of a size to represent approximately 80% of the surface area of the front surface 11. I prefer to interconnect the doors 12 and 14, in a manner described hereinafter, such that these doors will move together between open and closed positions.

Figure 2:
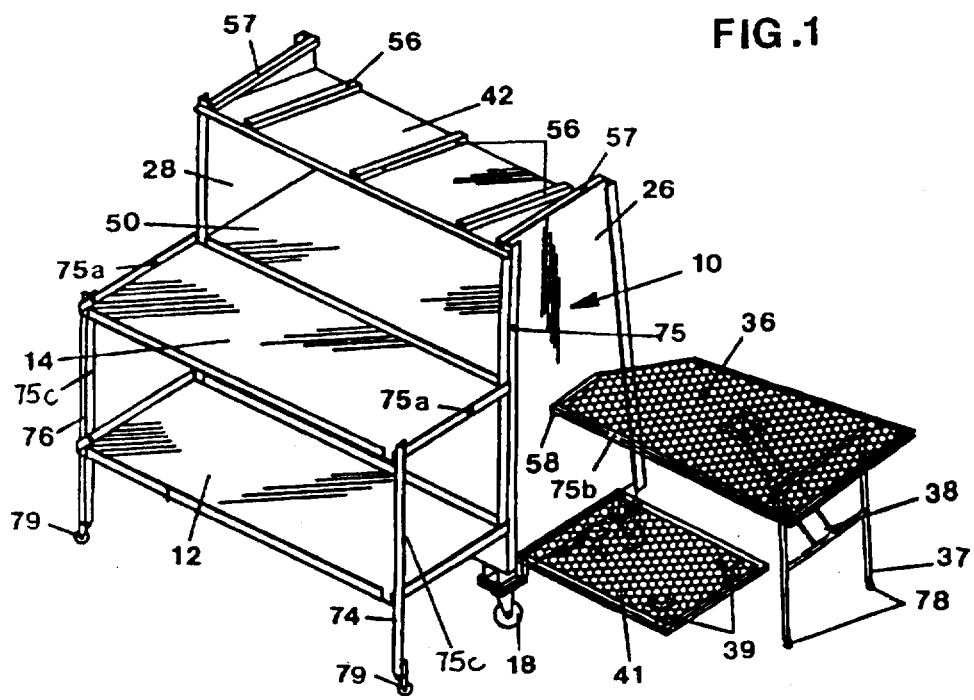

In FIG. 1 I have shown my portable workshop in its storage or closed condition, whereas in FIG. 2 I have shown the workshop with the laterally extending doors 12 and 14 in their open positions. When the laterally extending doors are in their open or active positions, the doors 12 and 14 advantageously form ideal working surfaces for use by a carpenter or other craftsman. I regard the upper door 14 as being the principal working surface of my novel workshop, for on it the craftsman can readily undertake operations such as cutting an item to length, sanding, assembling, nailing and the like.

Figure 3:
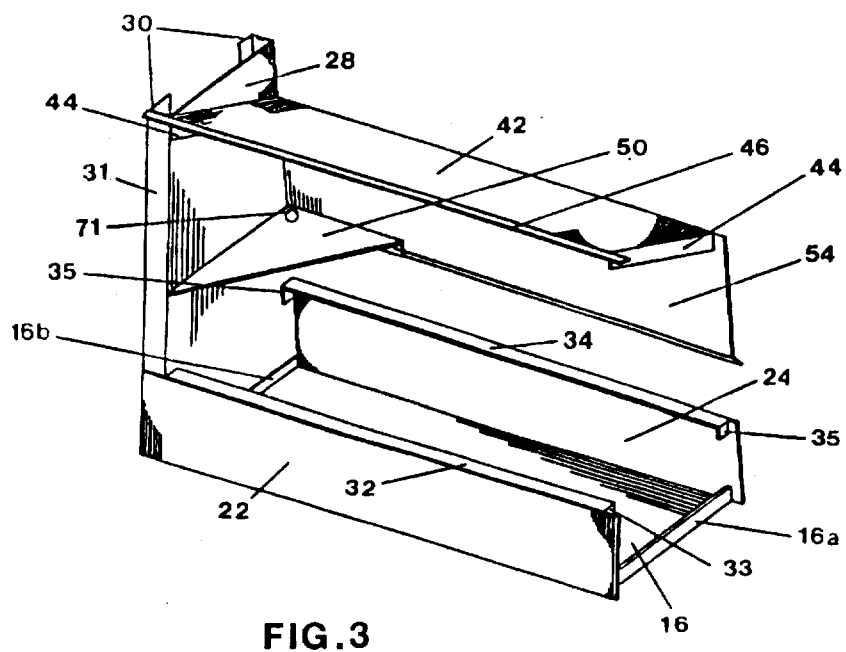
FIG. 3 is a fragmentary perspective view, revealing in some detail, the base member of my device, to which other components are affixed.

The base member 16, preferably of one piece construction, extends essentially the full width or major dimension of the portable workshop, with FIG. 3 revealing a preferred configuration of the base member. On the underside of the base member 16 four relatively small wheels 18 are mounted, but with only three of such wheels being visible in FIG. 1. The wheels 18 are located adjacent lower corners of the device, provided so that the craftsman may easily roll the device 10 from one location to another.

Inasmuch as the base or bottom member 16 is closely associated with the basic construction of my novel device, reference is made to FIG. 3, where it is to be seen that the base member 16 is preferably made of a single piece of sheet metal that has been bent so as to form a front flange member 22 and a rear flange member 24. The base member 16 may be made of 16 gauge sheet steel and may for example be four feet long, six feet long or eight feet long, depending on the size of the box or workshop being constructed. Quite obviously, I am not to be limited to any of these dimensions.

Fastened between the ends of the front and rear flanges 22 and 24 is end surface or side member 26 that may be seen in FIGS. 1 and 2 to extend approximately the full height of my device, with the surface 26 being wider at the bottom than at the top. A substantially identical end surface or side member 28 is located at the other end of the device 10, with latter end surface being partially visible in FIGS. 2 and 5. As will hereinafter be discussed in connection with FIG. 4, the long sides of member or surface 26 (and of member or surface 28) have edges 30 that are configured so as to possess a significant amount of curl or curvature, thus to form a handy storage means for an elongate, flat item, such as a table; note the storage position of table 36 in FIG. 1.

Returning to FIG. 3 for a further consideration of the base or bottom member 16, the front flange 22 and the rear flange 24 of the base member 16 are each approximately 7 inches in height and extend for essentially the full width or left-right dimension of my novel device. As can be discerned from FIG. 3, the front and rear flanges 22 and 24 reside in a parallel relationship and in one preferred instance were located approximately 24 inches apart, although I am obviously not to be limited to this particular dimension. At the top of each of the flanges is a 90° inward bend, thus to form a shelf-like member 32 typically about one inch in width extending along the top of the front flange 22, and a shelf-like member 34, also approximately one inch in width, extending along the top of the rear flange 24. Each of these relatively narrow members forms a satisfactory support for a respective continuous, door-supporting hinge at each location, as will be discussed shortly.

At each of the ends of base or bottom member 16 are vertically disposed flanges 33 and 35, best seen in FIG. 3. These flanges fold downward so as to be able to be welded to lower interior portions of the end surface or side member 26. In a like manner, the bent over flanges 33 and 35 located at the opposite end of my device are to be welded to lower interior portions of end surface or side member 28.

Also visible in FIG. 3, at the near end of the base member 16, is the upwardly folded bottom flange 16a, whereas at the far end of the base member, the upwardly folded bottom flange 16b is visible. These flanges are also to be welded to the lower interior portions of the respective end surfaces.

From FIGS. 1 and 2 it will be seen that the sturdy upper member or top panel 42 serves as the upper closure for my novel workshop, such that an enclosed space suitable for the storage of tools will be defined. The upper member 42 begins on the front side of box 10 and runs to the back side of the box in a downwardly sloping manner. This angularity of the upper member 42 is occasioned by the fact that the front surface 11 is slightly higher than the rear surface 20, latter surface being visible in FIG. 6. The upper member 42 then continues down the back side of box 10, in contact with the rear panel 54, with this rear panel being shown in FIGS. 3 and 5. I may wish to construct the upper member 42 and the rear panel 54 of a single piece of sheet steel that has been folded at the appropriate location, but this obviously is not a requirement.

Because the upper member 42 or roof component is slanted or sloped, there will be no accumulation of rain or snow thereon, but in addition to this, tubularly shaped receptacles 56 mounted on the upper member 42 are disposed at a favorable angle for the support of certain ancillary devices, as will be discussed hereinafter.

It is to be noted that the left and right ends of the upper member 42 are fastened to interior portions of the end surfaces or panels 26 and 28, this being made readily possible by the provision of an end flange 44 on each end of the upper closure member 42. As depicted in FIG. 3, the flanges 44 extend along the downward sloping portion of upper member 42. It is to be understood that each end flange 44 folds downwardly for the distance of approximately one inch.

Along the front portion of upper member or roof panel 42, running its full length, is flange 46, which is about one inch wide and folds downward somewhat above the upper door member 14, as shown in FIG. 1. The flange 46 may be seen in greater detail in FIG. 3. The ends of the downward folding flange 46 come into contact with upper interior portions of end surfaces 26 and 28. These end surfaces 26 and 28 are welded to upper member 42 at the point where the side flanges 44 come in contact with upper interior portions of the end surfaces. Inasmuch as the previously-mentioned flanges 33 and 35 as well as the flange 16a of the bottom member 16 are also welded at several locations to the end surface 26, and like construction is utilized at the opposite end of the device, the box portion of my novel workshop 10 is caused to be very rigid and sturdy. As will be discussed hereinafter, the upper member 42 is designed to be weight bearing.

Figure 6:
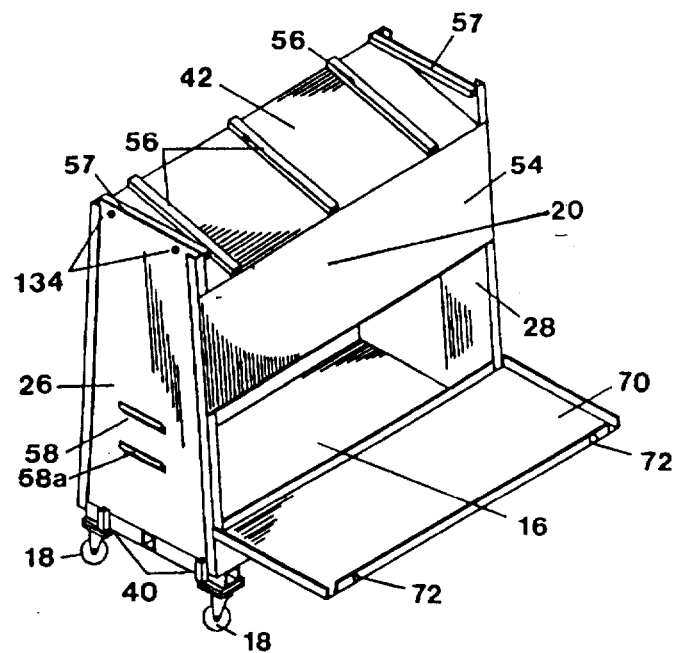
FIG. 6 is a perspective view of the rear side of my novel portable workshop, showing that a laterally extending rear door can be utilized.

With reference now to FIG. 6, it will be seen that a bottom hinged, laterally extending door 70 is operatively mounted in the rear surface 20 of my device. The rear door is advantageous in enabling a second craftsman or worker to be able to remove tools or other items from the interior of the workshop without disturbing a craftsman actively using the principal work surface 14.

It will also be noted from FIG. 6 that mounted on the end surface 26 is a horizontally disposed support device 58 approximately seven inches in length, which resembles an elongate Z in cross section. A similar device is installed on an outer portion of the other end surface 28. Each support device 58 is located approximately ten inches up from the bottom of the respective end surface, and each may be utilized for supporting the small end of the table 36.

Continuing with FIG. 6, it will be seen that a second support device, member 58a, is installed on each of the end surfaces approximately five inches below the member 58, and in a parallel relation therewith. These members may also be utilized in the support of the work table 36 visible in FIG. 2. When the road wheels 138, discussed in connection with FIGS. 11-13, have been installed on the underside of the workshop, this necessarily affects the height above ground of the base member 16, and consequently the height of the remaining portions of the workshop above ground. When the road wheels are in place, the support device 58a, rather than the support device 58, is to be used in supporting the end of the table 36.

Figure 4:
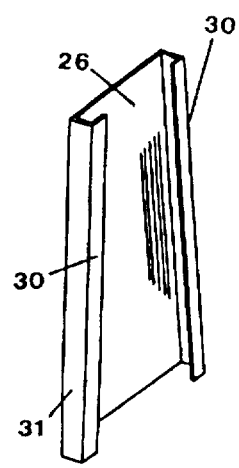
FIG. 4 is a fragmentary view of one of the end members of my novel portable workshop, which has long edges configured so that a table can be stored on the end of the portable workshop, retained in place by the configured edges of the end member.

From FIG. 1 it was noted that the work table 36 is in its stored position on the end surface 26, with the curved edges 30 of the end surface 26, best seen in FIG. 4, serving as a safe repository for the work table 36 when it is not being utilized.

With regard to FIG. 2 it is to be observed that I have shown the work table 36 removed from the stored position and moved into a position in which it may receive an item to be used by a carpenter or other craftsman, such as a table saw, vise, drill press or the like. In the interests of providing numerous holes usable for anchoring a variety of power tools, the table 36 may be made of expanded metal or the like. In addition, sawdust and other small debris can fall through such holes. When the table 36 has been moved into its horizontally-disposed position, a folded over component at the smaller end of the table is removably supported by the respective Z member 58, whereas folding legs 37 are used to support the other end of the table. The legs 37 are held in a secure relationship to the table 36 by folding brace member 38, which provides a desirable amount of rigidity. Small wheels 78 may be provided at the bottom of legs 37, such that the craftsman will be permitted to roll the portable workshop from location to another with the table 36 in the deployed position. Also, the wheels 78 permit the user to lift the small end of the table away from the support member 58, and pull the table around to a different location.

Figure 13:
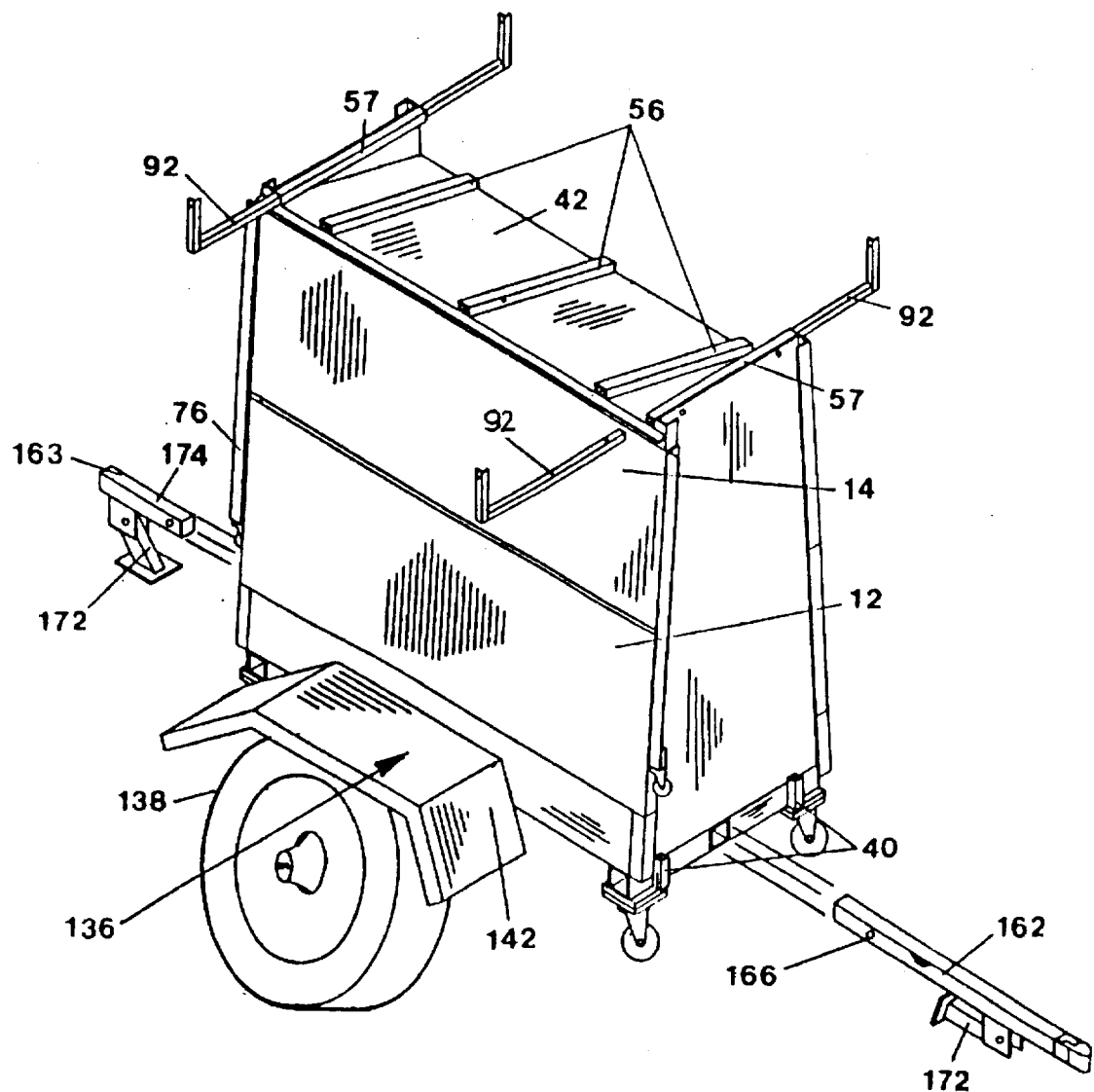
FIG. 13 is a perspective view showing my novel portable workshop supported by the pair of large wheels, with the towbar in place such that the workshop can be pulled along a highway or roadway by the use of a towing vehicle.

Also visible in FIG. 2 is a compressor table 41, which has components on one end for engaging the short vertical receptacles 40 mounted near the lower edge of my portable workshop, which receptacles are visible in FIGS. 1, 6 and 13. Wheels 39 may be provided on the underside of the compressor table 41, so that the when the table has been removed from the portable workshop, it may be easily moved to another location. As in the case of table 36, the table 41 may be made of expanded metal or the like.

Figure 5:
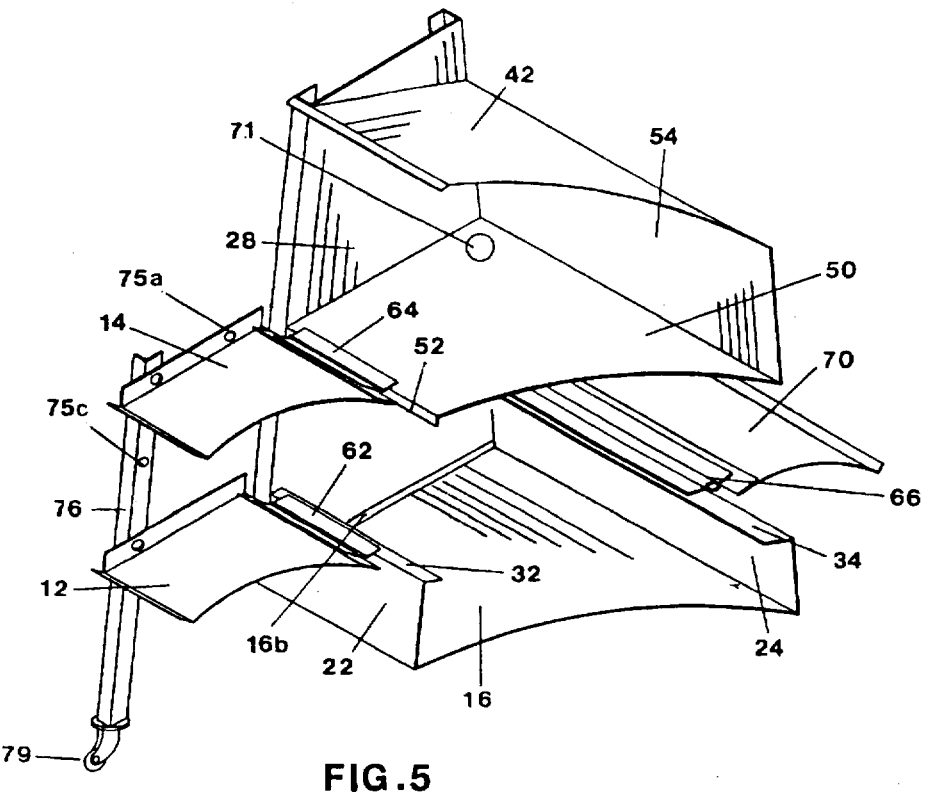
FIG. 5 is a fragmentary perspective view generally along the lines of FIG. 3, but revealing fragmentary portions of the hinges attached to the bottoms of the laterally extending doors, by which hinges the doors are principally supported.

Turning now to FIG. 5, it will be seen that certain significant details of the interior construction of my device are made apparent, and it will be noted that one end of the rigid shelf 50 is welded to an interior portion of the end surface 28, with it to be understood that the other end of the shelf 50 is welded to the interior of the end surface 26, not visible in FIG. 5, but of course visible in several of the other figures. The rear edge of the shelf 50 is continuously welded along the rear panel 54, so as to contribute significantly to the overall rigidity of my novel portable workshop 10. I prefer for the shelf member 50 to have flanges one inch in width on four sides, with the reward flange and the end flanges folded downward and welded the rear member 54, and to the end surfaces 26 and 28, respectively.

It is to be noted that the sturdy shelf member 50 is located in a mid portion of my workshop, and serves to divide the upper interior portion of the workshop from the lower interior portion. This is quite advantageous over the arrangement used in many prior art gang boxes, in which all of the tools of the various workmen were piled one on top of another, thus making a particular tool difficult to locate. The use and placement of my shelf member 50 makes it readily possible to separate the various stored tools into different groups.

Continuing with the shelf member 50, this component is positioned in substantial alignment with the principal working surface, the upper door 14. This highly advantageous arrangement makes it quite unnecessary for the craftsman to have to lift an item stored on the shelf in order to gain access to such item. More specifically, the shelf member 50, being located in a mid portion of my portable workshop, serves as an ideal support surface for a so-called chop saw, which can readily be pulled out onto the deployed principal working surface 14 when the craftsman is ready to undertake cutoff operations. After use, the chop saw (or other such tool or component) can be easily pushed back into the interior of the workshop without any lifting of the chop saw being necessary. This convenient arrangement involving the shelf member 50 disposed in a relatively close, substantially aligned relationship to the principal working surface 14 makes it quite unnecessary for the craftsman to have to lift the chop saw, as was usually necessary in previous arrangements, when a chop saw was being moved out of, or back into, its storage location.

In view of the fact that the rigid shelf member 50 has a substantial dimension in a left-right direction, the chop saw or other such tool or tools can be placed in a selected location on the shelf member. This makes it readily possible for a craftsman to move the chop saw (or other tool) from one position to another on the shelf 50, as may best suit his needs when using the shelf for the storage of additional items.

With reference to the front portion of FIG. 5, it will be seen that one of the long sides of the continuous hinge 62 is secured to the narrow shelf-like member 32 forming a part of the base member 16, with the other long side of the hinge 62 being affixed along the lower edge of the lower, laterally extending door 12, thus forming the principal support for this bottom hinged door. It is to be understood that the lower door 12, when moved into its deployed position, forms a ready location upon which the craftsman utilizing the principal working surface 14 can conveniently place items with which he is working, such as his nail gun, electric drill, miscellaneous small tools or the like, thus enabling the principal working surface 14 to remain relatively uncluttered.

Somewhat similarly to the construction utilized in connection with the lower door 12, one of the long sides of the upper continuous hinge 64 is secured to the front edge 52 of the rigid shelf 50, in the manner illustrated in FIG. 5. The other long side of the hinge 64 is affixed along the lower edge of the upper, laterally extending door 14, thus forming a stable and effective support for this principal working surface. As brought out hereinabove, the upper door 14, when folded down into the use position, is in substantial alignment with the shelf 50.

Additionally shown in FIG. 5 is continuous hinge 66 which is located on the rear surface 20 of my portable workshop. One of the long edges of the hinge 66 is affixed to the previously described, narrow shelf-like member 34, whereas its other long edge is affixed to the lower edge of the rear door 70. It is to be understood that the hinge 66 forms the principal support for laterally extending, bottom hinged rear door 70, with this door being best seen in FIG. 6. This figure will shortly be discussed at greater length.

As one of the significant aspects of my invention, the over-under arrangement of bottom hinged, laterally extending doors 12 and 14 involves doors that are relatedly movable as a result of the utilization of interconnection members 74 and 76; note FIG. 2. The interconnection members are attached by simple pins, rivets, or nuts and bolts (untightened) to the edges of the upper corners of the doors 12 and 14, so that the doors will at all times move smoothly in a related manner either upwardly or downwardly. It is to be noted that the interconnection members 74 and 76 are sized so that both of the doors, when they have been opened, will be held in a horizontal position, as depicted in FIG. 2, thus to form effective work surfaces for use by the craftsman. The interconnection member 76 is visible in a particularly clear manner in FIG. 5. With the addition of small wheels 79, placed at the bottom of the interconnection members 74 and 76, the box 10 can remain mobile to a certain extent, even when the doors 12 and 14 are in their open positions. In other words, the lower ends of the interconnection members, when in contact with the ground, do not inhibit the carpenter or other craftsman deciding to push or pull the workshop from one position to another because of the utilization of the wheels 79.

As should be apparent from FIGS. 1, 2 and 6, door members 12, 14 and 70 each extend substantially the full width of the box or workshop 10, and wrap about two inches around end surfaces 26 and 28 when the doors are in their closed positions. I typically construct the doors 12, 14 and 70 of 16 gauge steel, although I obviously am not to be limited to this. Viewed with the doors in the closed position depicted in FIG. 1, I prefer for the doors to be approximately 20 inches in height. Inasmuch as the two doors thus total 40 inches of height, and the front surface 11 of the workshop measured from the bottom of the base member 16 to the upper member 42, is approximately 50 inches in total height, it may be readily seen that the surface area of the two doors constitute approximately 80% of the front surface of my novel workshop.

Inasmuch as one function of my novel device is to permit the safe overnight storage of tools, I provide suitable holes in various components, through which the shackle of a padlock or the equivalent can be inserted. For example, in FIGS. 3 and 5 I reveal a hole 71 through a rear corner of the rigid shelf 50, intended to receive a bolt, pin or other such component to be utilized in the locking of the rear door 70. A like hole is provided at the opposite end of the shelf 50. The provision of these holes will be discussed hereinafter.

As a further example, in FIG. 2 I reveal holes 75, 75a and 75b that have been drilled or otherwise formed in the several interfitting components. In FIG. 2 it is revealed that hole 75 has been drilled or otherwise formed in the front edge of the end member 26, whereas a hole 75a has been drilled or otherwise formed in each end of door 14. In addition, a hole 75b has been drilled or otherwise formed in the near edge of the table 36, and a hole 75c has been created in each of leg members 74 and 76. As a consequence of this arrangement, when the doors 12 and 14 have been moved into the closed position depicted in FIG. 1, holes 75a come into alignment with holes 75 formed in end surfaces 26 and 28 as well as into alignment with holes formed in the interconnection members 74 and 76 and the table 36. This arrangement permits the shackle of a padlock to be inserted through each set of aligned holes, and when the table is involved, through the table as well, thus to lock the doors and the table in place. As is obvious, this enables a highly effective locking of the box 10 to be accomplished, keeping the tools and components safe from theft.

Returning to a further consideration of FIG. 6, it will be seen that with the rear door 70 in the open position, holes 72 drilled or otherwise formed in upper edges of the door 70 become visible. It is to be understood that the holes 72 line up with the previously mentioned holes 71 provided in the rear corners of the fixed shelf 50, thus permitting the insertion of a bolt, pin or other locking member through each set of aligned holes, to accomplish the locking of the rear door. The rear door 70 is advantageous, as previously mentioned, in enabling a second craftsman or worker to be able to remove tools or other items from the lower interior of the workshop without disturbing a craftsman actively using the principal work surface 14.

Figure 7:
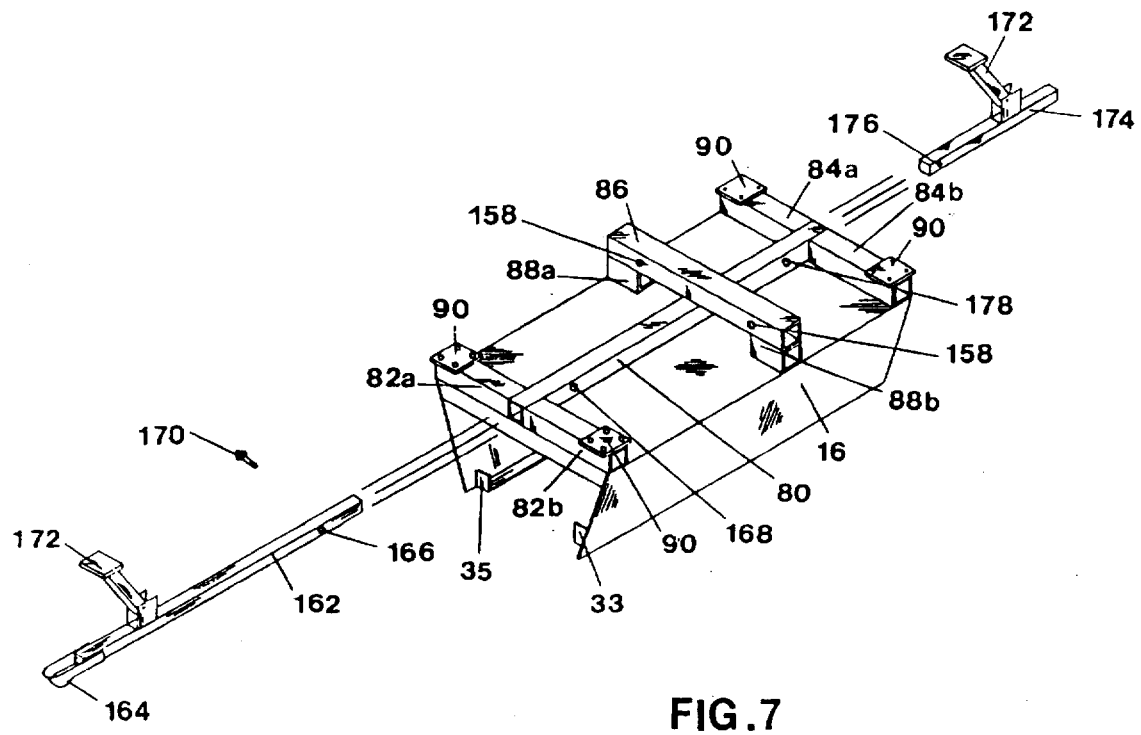
FIG. 7 is a perspective view of the underside of my portable workshop, revealing the elongate structural member running the full width or long dimension of the base member, with the elongate structural member preferably being of square tubing and serving as the mounting means for the towbar utilized when the portable workshop is to be towed along a highway.

Turning now to FIG. 7, it will be seen that this is a perspective view of the underside of my portable workshop, with this figure revealing the utilization of an elongate structural member 80, typically of square steel tubing, running the full width or long dimension of the base member 16. Secured at right angles to the elongate structural member 80 is a structural member 86 that forms the sturdy support means for large wheels that may be added to the underside of my portable workshop when it is to be transported by street or highway to a new location. Further details of the members 80 and 86 will be discussed shortly.

From FIG. 7 it will be appreciated that undesirable downward bending of the base or bottom member 16, such as when tools or other heavy objects are being supported in the interior of the device, is prevented by welding or otherwise securing certain sturdy structural members, preferably of square walled steel tubing, to the underside of the base member 16.

With further reference to the elongate structural member 80 running the full left-right dimension of the base member 16, it is preferably constructed of square steel tubing some 2 inches on a side. In such instance, the longitudinal member 80 has an inside dimension of approximately 1¾ inches by 1¾ inches, with these measurements being of particular consequence in connection with the towing of my portable workshop behind a pickup truck or the like, as will be explained hereinafter. It is important to note that when my portable workshop is being towed, the longitudinal member 80 may at that point be regarded as residing in a front-to-back direction rather than in a left-right direction.

Continuing with FIG. 7, it will be seen that structural members 82a and 82b of square wall tubing are secured at the near end of the base member 16, with these members being in substantial alignment, and residing in a perpendicular relationship with respect to the front flange 22 and the rear flange 24 of the base member 16. Mounted on the exterior surfaces of members 82a and 82b, at locations close to their outer ends, are pads 90 upon which the mounting portions of two of the previously-mentioned wheels 18 are secured. Bolts are typically utilized for securing the mounting portions of the small wheels 18 to the pads. In a like manner, the structural members 84a and 84b are secured at the far end of the base member 16, with the surfaces remote from the base member 16 supporting, at their outer ends, pads 90 upon which the mounting portions of the other two small wheels 18 are secured.

The previously mentioned structural member 86 is welded on the underside of my portable workshop at the midpoint between the left and right ends of my novel device. Unlike the members 82a and 82b, and the members 84a and 84b, which are discontinuous, the member 86 of square steel tubing is continuous. Inasmuch as a center portion of the member 86 is welded to a center portion of the longitudinally extending member 80, it is necessary to use standoffs at the ends of member 86, so that it can reside in a parallel relationship to the structural members at the ends of the workshop. More particularly, I use member 88a as the support for one end of the member 86, and member 88b as the support for the other end of the member 86, in order that member 86 can reside in a stable, parallel relationship to the members 82a & 82b, and the members 84a & 84b. As is obvious, the height dimension of the members 88a and 88b is the same as the height of the members 82a & 82b, and 84a & 84b. The members 88a and 88b are welded to the base member 16 and to the front-to-back member 86, so as to define a particularly strong structural arrangement.

The outer dimensions of the member 86 are preferably 2 inches by 2 inches, whereas the interior dimensions of member 86 are preferably 1¾ inches by 1¾ inches, so as to be able to receive structural components slid into its interior. Such components are utilized in connection with the installation of large wheels on the underside of my workshop, as will shortly be described in connection with FIGS. 11 and 12.

With reference back to FIGS. 1, 2 and 6, it will be noted that in three locations on the upper surface of the sturdy, weight-bearing upper member 42, receptacles 56 of square steel tubing are secured in an essentially parallel relationship, typically accomplished by welding. One receptacle 56 is in the center of the upper member 42 and extends downward from front toward the back. The other two receptacles 56 are installed on the roof member 42 an equal distance on each side of the center receptacle and parallel therewith.

These elongate receptacles 56 of square internal configuration have interior portions intended to receive elongate components associated with the support of certain ancillary devices, discussed hereinafter. All of the devices to be supported have insertion components which are of somewhat smaller dimension than the interior of the receptacles 56, such that they will fit snugly therein.

In addition to the tubularly shaped receptacles 56, I may also install a tubular member 57 at each end of the upper member 42, into which certain other devices may be installed, as will be discussed hereinafter. Unlike the angularity of the receptacles 56 with respect to the principal surface of the base member 16, tubular members 57 are preferably affixed adjacent the upper member 42 in an essentially horizontal relationship, that is, parallel to the principal surface of the base member 16.

Figure 8:
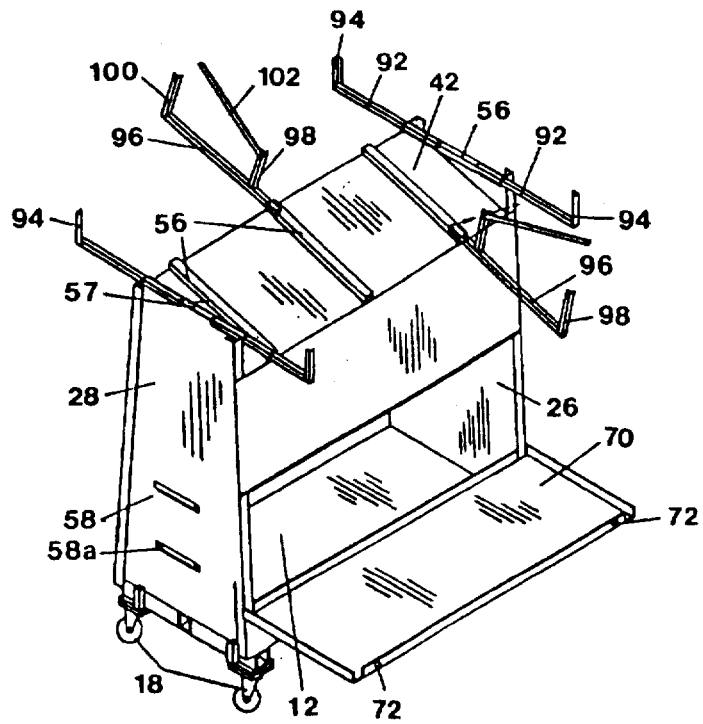
Figure 9:
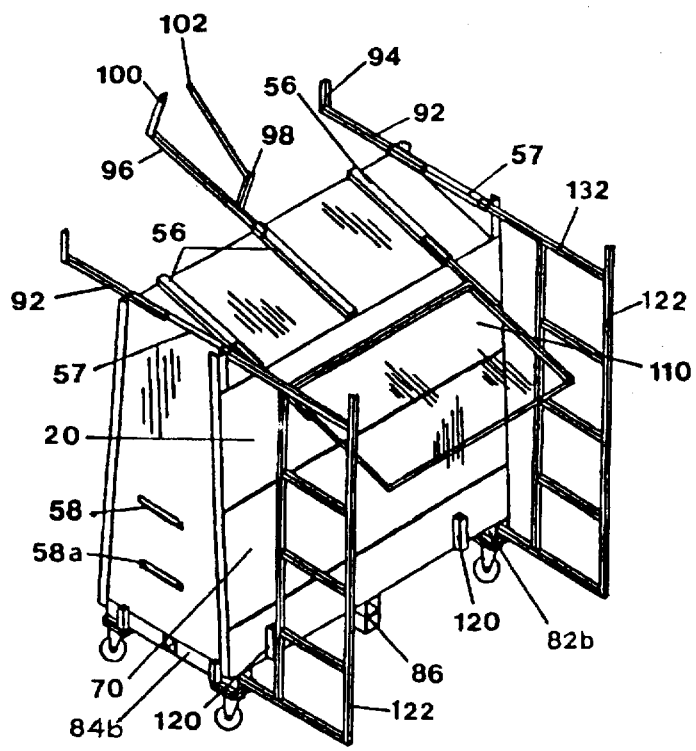

With regard to FIGS. 8 and 9, it will be seen that a pair of members 92 have been designed to fit snugly into respective tubular end members 57, with one of these tubular members 57 being located on the upper part of end surface 26, and the other located on the upper part of end surface 28, thus disposing the members 57 adjacent each end of the upper member 42. As shown in FIG. 8, either one or two members 92 can be installed in a given tubular member 57 at any one time, for the purpose of supporting air hoses, extension cords and the like in a position for ready use. As shown in FIGS. 8 and 9, each member 92 has a member 94 welded at a right angle on the end thereof.

Devices other than the members 92 may be installed either in the tubularly shaped receptacles 56, or in the tubular members 57, depending upon the use to which such devices are to be put.

Figure 10A:
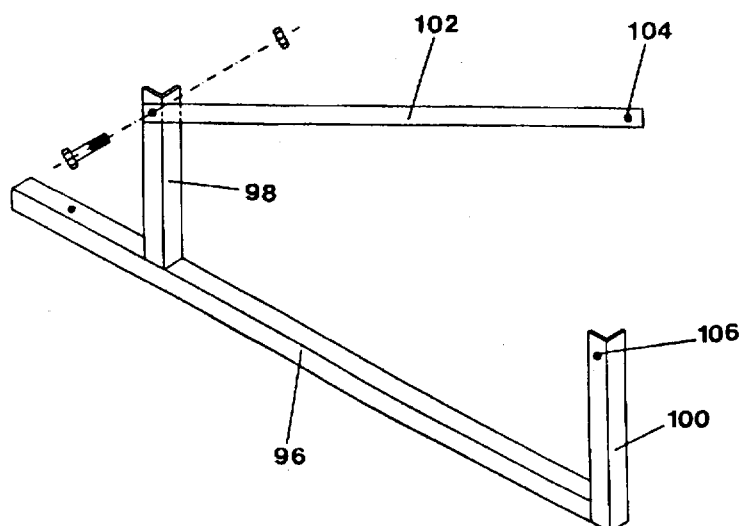
FIG. 10a is a somewhat enlarged view of a member able to be inserted into a sturdy receptacle mounted on the top member of my novel workshop and thereafter used for locking hoses and extension cords and the like, to prevent theft.

Another member which also fits snugly into any one of the tubularly shaped receptacles 56 is the member 96, visible in full detail in FIG. 10a. The member 96 is constructed to have a pair of members 98 and 100 attached in a generally perpendicular relationship thereto, with the members 98 and 100 each being about 4 inches long, and disposed in an essentially parallel relationship to each other. Visible in FIG. 10a as well as in FIGS. 8 and 9 is a bar member 102 hingedly attached at the top of member 98. The bar member 102 is of a length such as to be movable into contact with the top of member 100. As best seen in FIG. 10a, I provide a hole 104 adjacent the end of member 102 and a hole 106 adjacent the top of member 100, to permit the shackle of a padlock to be passed through the holes 104 and 106, to enable the hoses or cords to be locked to the member 96.

With reference back to FIG. 6, it will be seen that a pair of holes 134 have been provided adjacent the tubular member 57 disposed in a substantially horizontal position near the upper edge of end surface 26, with it to be understood that a like pair of holes are provided adjacent the tubular member 57 affixed to the upper edge of end surface 28, adjacent the other end of the upper member 42. A comparable hole is provided in each tubular member, drilled from the inside of the box 10 and through the edge of the upper member 42.

Figure 10B:
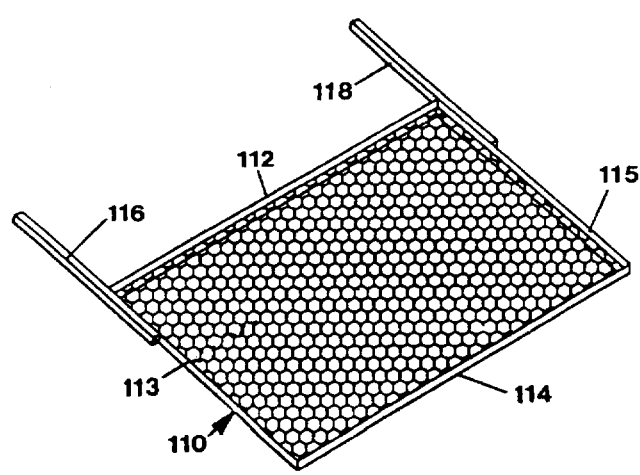
Figure 10C:
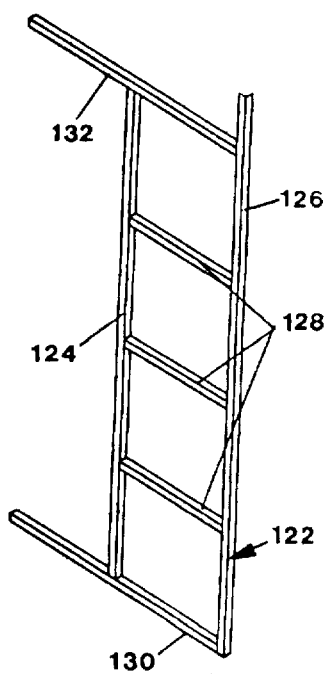
FIG. 10c is a perspective view of a typical lumber rack that may be carried on my portable workshop in a stored position, and then utilized in pairs, in the manner shown in FIG. 9, when lengthy items are to be stored.
Figure 10D:
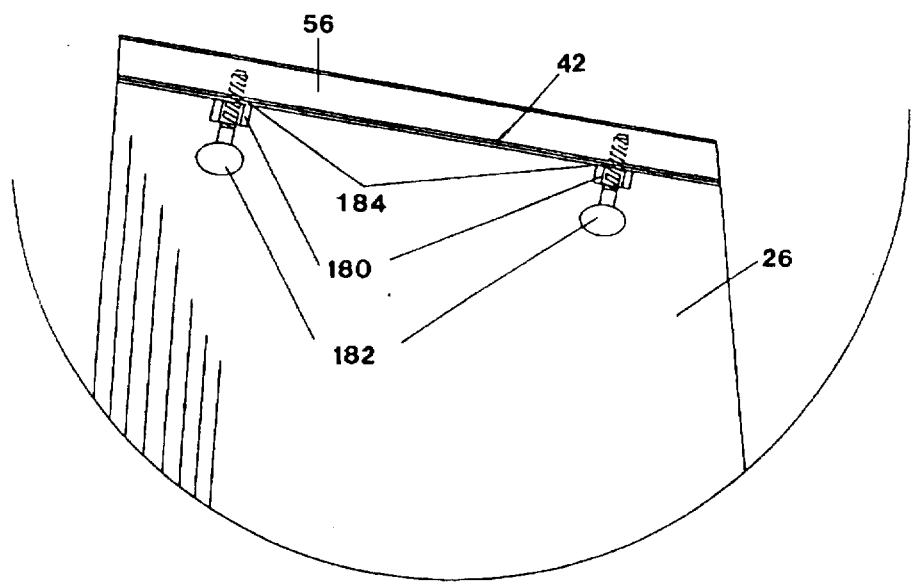
FIG. 10d is a cross sectional view, to a somewhat enlarged scale, of a top portion of my device, showing how the component depicted in FIG. 10a for use with hoses and cords can be locked in place from the underside of the top member.
Figure 10E:
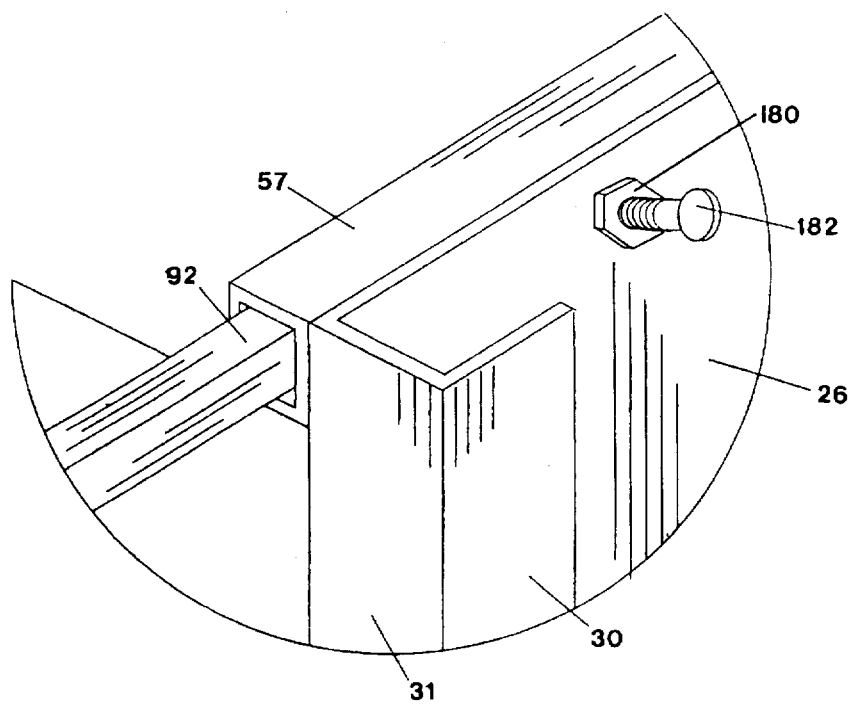
FIG. 10e is an enlarged fragmentary view off an upper corner of my device, revealing how an elongate support member, such as used for the storage of lumber, may be readily locked into place.

With reference now to FIGS. 10d and 10e, it will be seen that I have provided two somewhat different arrangements for locking the ancillary components to the upper member 42. First with regard to FIG. 10d, it will be seen that I have drilled a pair of holes upwardly into the undersurface of a typical elongate, tubularly shaped receptacle 56, with a nut 180 welded over each hole. This arrangement serves as an appropriate mounting means for threaded thumb bolts 182, which can be tightened into firm contact with an elongate member, such as is associated with one of my ancillary devices.

Somewhat similarly, and with reference to FIG. 10e, it will be seen that a nut 180 has been welded over the hole in the end surface 26 so that a bolt 182 may be used to tighten down on each bar member 92.

With reference now to FIG. 9, it will be seen that I have provided another device which also fits snugly into tubular receptacles 56 mounted on the upper member 42. This is plan table 110, to be seen above and outboard of the rear surface 20 of my novel workshop. Because of the downward inclination of the members 56, the plan table will be caused to be at a convenient height for use by a workman desiring to make a study of a comparatively large blueprint, drawing, photograph or the like.

Plan table 110 is visible in greater detail in FIG. 10b, with it to be seen that the table comprises two members 112 and 114 disposed in a parallel relationship. These members are disposed in a perpendicular relationship to members 113 and 115, with these latter two members disposed in a parallel relationship to each other. The abutting corners are welded or otherwise secured together so as to form a sturdy rectangle approximately three feet on a side, although I obviously am not to be limited to this particular size.

Tubes 116 and 118 are approximately two and a half feet in length, and these are affixed to the members 113 and 115, with approximately six inches of the tubes 116 and 118 extending past the rectangularly shaped portion of the table 110. The outwardly extended portions 116 and 118 are sized to fit snugly into the sturdy, angularly mounted tubular receptacles 56 that are affixed to upper member 42. As is obvious, the plan table 110 is sized such that the members 116 and 118 will be spaced apart a width corresponding to the spacing of the angularly disposed members 56.

The rectangular portion of the plan table 110 is principally constituted by expanded metal, which forms the working surface of the table without providing a considerable weight penalty. By virtue of the support arrangement I utilize, the table 110 is disposed at a convenient height for most users, enabling a blueprint or the like to be spread out in a manner such that it can be studied carefully.

Support for the plan table 110 when not in the deployed position is made possible by the use of relatively short tubular members forming vertically disposed receptacles 120 welded along the lower rear portion of workshop 10; note FIG. 9. These tubular members 120 are mounted in a spaced relationship corresponding to the spacing of the members 116 and 118, and these serve as supports for the plan table 110 when either the table in not in use, or when the workshop is in transport.

With continuing reference to FIG. 9, it will be seen that one of the devices that may be inserted into a tubular member 57 disposed at the ends of the upper member 42 is the upper member 132 of a lumber rack 122, with FIG. 10c revealing a typical lumber rack in clear detail. As is obvious, each lumber rack 122 is constructed in much the configuration of a ladder, and as shown in FIG. 9, it is intended that a pair of essentially identical lumber racks 122 be used in connection with the tubular members 57 of my novel portable workshop.

With particular reference to FIG. 10c, it will be seen that elongate members 124 and 126 form the vertical portion of each ladder-like member 122. Three or more members 128, such as of angle steel or the like, run parallel to one another and form the second, third and fourth steps of the ladder-like member. These step members are about one foot apart, and each is approximately one foot long.

It is to be understood that the first or lowest step of each rack member 122 is the lower member 130, which typically is about two feet in length. The outwardly extending portion of the lower member 130 of one of the ladder-like members is configured to slide into the square tube member 82b on the underside of the base member 16; note FIG. 7 as well as FIG. 9. In a like manner, the outwardly extending portion of the lower member 130 of the other ladder-like member is configured to slide into the square tube member 84b, as revealed in FIG. 9. As is readily apparent, by the upper and lower portions of each of the lumber racks firmly engaging respective portions of the workshop, the racks 122 are mounted in a very sturdy manner. As is obvious, two rack members utilized together in a cooperative relationship are needed to make conveniently possible the storage of lengthy members such as lumber, PVC tubing and the like.

Figure 11:
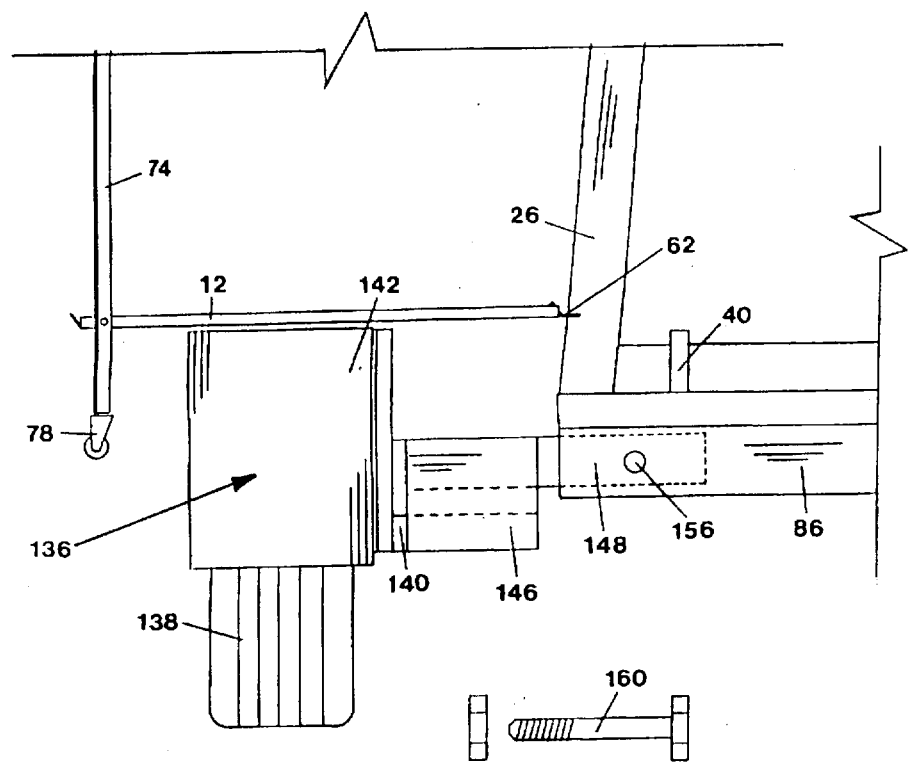
FIG. 11 is a view looking rearwardly on the right hand side of my device at a typical wheel assembly in accordance with my invention, showing how the wheel assembly can be removably affixed by the use of a pin to one of the structural members on the underside of my device.
Figure 12:
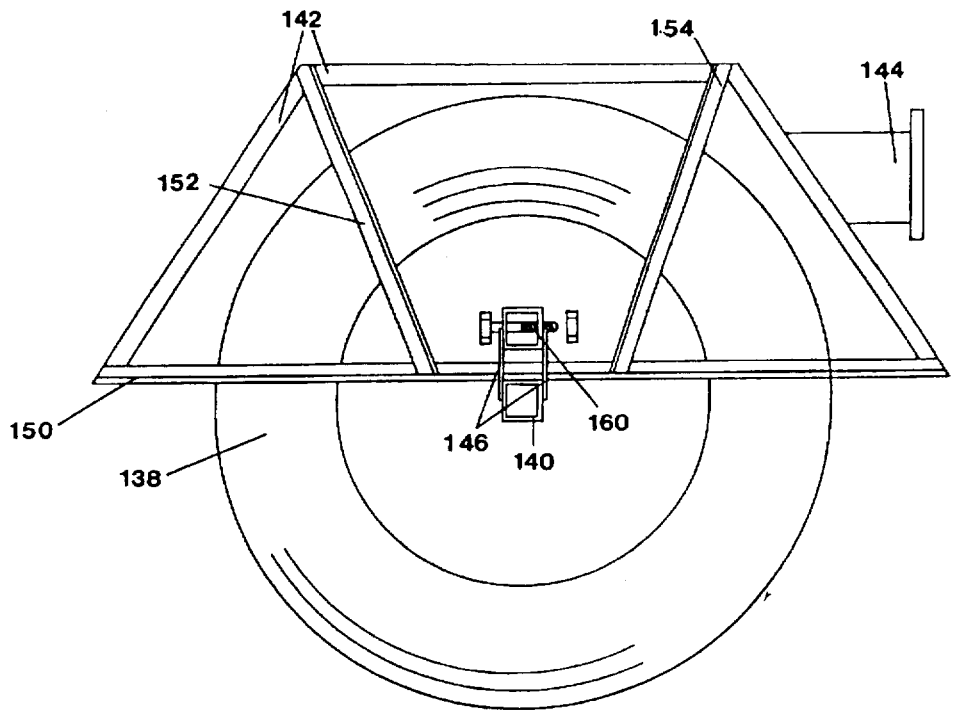
FIG. 12 shows the removable wheel assembly of FIG. 11 as viewed from a direction 90° away from FIG. 11.

Turning now to FIGS. 11 and 12, it will there be seen that I have shown components of the preferred type of removable wheel assembly 136 utilized when my novel portable workshop is to be transported from place to place, such as along a roadway or highway. Typically a pickup truck is utilized for pulling the workshop, but obviously I am not to be limited to this, for many automobiles are sturdy enough to pull my workshop along a street or highway.

The wheel assembly 136 involves tire 138, wheel axle 140, fender 142 and tail light 144, all of which are standard, commercially available items. Inasmuch as the wheel assembly to be utilized on the right hand side of my novel portable workshop is substantially identical to the wheel assembly to be used on the left hand side of the portable workshop, only the wheel assembly utilized on the right will, in the interest of brevity, be described in detail. FIG. 11 is a view looking rearwardly on the right hand side of my device at a typical wheel assembly in accordance with my invention.

It will be noted from FIG. 11 that the height relationship of the wheel assembly to the portable workshop 10 allows the lower door 12, when in the open position, to rest on top of fender 142 such that the portable workshop 10 can be used in the intended manner even when the pair of large wheel assemblies are in place. Because of the utilization of the vertically disposed, elongate members 74 and 76 for holding the doors 12 and 14 in a relatedly movable relationship, the support of the lower door by the fender 142 causes the upper door 14, the principal working surface, to be disposed in this instance in a substantially horizontal position.

Sturdy steel plates 146, visible in FIG. 11 as well as in FIG. 12, are firmly attached, typically by welding, to the front and the back of wheel axle 140 in order to form a sturdy support for the bar member 148, which is also welded to the steel plates 146. This is accomplished in such a manner that the wheel axle 140 and the bar member 148 will be held securely in a vertically offset yet parallel relationship. The offset between the wheel axle 140 and the bar member 148 is such as to hold these components in the relationship illustrated in FIGS. 11 and 12, thus to increase road clearance to a proper extent and to make it possible for the lower door 12, when opened, to lie flat against the upper surface of the fender 142, as previously mentioned.

With particular reference to FIG. 12, angle member 150 runs in a horizontal manner from one end of the fender to the opposite end, on the side of the fender which is closest to the workshop 10. The angle member 150 is also welded to axle member 140. Relatively short angle members 152 and 154 attach to angle member 150 and run upward to upper portions of the fender 142 for the support of same.

It is to be noted from FIG. 11 that square tube 148 is of a smaller cross-sectional dimension than the interior of square tube 86, previously discussed in connection with FIG. 7, so as to fit snugly inside the square tube 86. As was seen in FIG. 7, a pair of holes 158 are provided in structural member 86, one adjacent each end. A horizontally disposed hole 156 is disposed in the bar member 148, as revealed in FIG. 11. At such time as a bar member 148 has been inserted into the respective end of the structural member 86, and the holes 156 and 158 have been lined up, a bolt 160 can be inserted in order to hold the bar member in place. In the interests of safety, I threadedly apply a suitable nut on the threads of bolt 160, so as to prevent dislodgment of same during use of the road wheels on the underside of my workshop.

As is obvious, when both of the bar members 148 have been inserted into respective ends of the structural member 86, and a bolt 160 has been used in each of the holes 158 of the member 86 in order to hold the bar members and their respective axles in place, the wheel assemblies become securely attached to workshop 10, making it possible for the workshop to be safely pulled down a highway behind any vehicle equipped with a standard tow package.

Referring back to FIG. 7, a towbar 162 is depicted, which is approximately five feet in length and which has tow coupler 164 welded at one end to allow workshop 10 to be attached to any suitable vehicle with a compatible trailer hitch. Bar 162, being of smaller cross-sectional dimension than the interior aperture of square tube 80, fits snugly inside the tube 80. A horizontally disposed hole 166 is provided in the bar 162, as clearly shown in FIG. 7, and when that hole is lined up with horizontally extending hole 168 provided in the member 80, a suitable bolt is inserted, which serves to secure the bar 162 in place in member 80. In the interests of safety, a nut is tightly affixed on the end of the bolt, to prevent any undesired dislodgment thereof.

It will be noted in FIG. 7 that attached to bar 162 is a standard industry foot rest 172, which is capable of being folded up and out of the way when the workshop 10 is being towed.

On the opposite end of the device 10 from the towbar 162 as viewed in FIG. 7 is a bar 174 of the same cross-sectional size as towbar 162, but shorter in length. As indicated in this figure, the end of the bar 174 can be inserted into the opposite end of the member 80, and by virtue of a horizontally disposed hole 176 provided in the bar 174 and a horizontally disposed hole 178 provided in a rear portion of member 80, the bar 174 can be locked to the member 80 at such time as the holes have been aligned and a threaded bolt has been inserted through the holes.

With reference now to FIG. 13, it will be seen that my portable workshop is disposed in a typical position for towing over roadway or highway, usually behind a pickup truck, but in many instances behind an ordinary vehicle equipped with a suitable towing ball or towing package. It is to be noted that when my workshop is being towed, the elongate member 80 may be regarded as extending in the longitudinal direction, whereas when the workshop is in use, the member 80 may be regarded as extending in a left-right direction.

It is to be understood that a craftsman can utilize my workshop even when the large wheels are in place, but as previously mentioned, it is highly desirable to utilize the footrest members 172, discussed in conjunction with FIG. 7, in order to stabilize the workshop in such an instance. Although both of the footrests are obviously in the retracted position illustrated in connection with the tow bar 162 in FIG. 13 at the time of towing, when the workshop is to be utilized, both of the footrests are in the extended position illustrated in connection with the bar 174 in this figure, and in FIG. 7.

I claim:

1. A portable workshop having a storage mode as well as an active mode in which working surfaces are presented for use by a carpenter or other craftsman, said workshop comprising a front surface in which upper and lower bottom hinged doors of generally rectangularly-shaped configuration are operatively mounted, said workshop also having a rear surface and a pair of end surfaces interconnecting said front and rear surfaces, and an upper member operatively associated with upper edges of said front, rear and end surfaces, said upper member serving with said surfaces to define an enclosed space suitable for the storage of tools and the like, a wheeled base member serving as the support for said front, rear and end surfaces, and means operatively associated with said upper and lower doors for causing said doors to open and close together, and means for causing said doors, when opened, to reside in essentially a horizontal attitude, so as to serve as work surfaces for use by the carpenter or other craftsman.

2. The portable workshop having a storage mode as well as an active mode as recited in claim 1 in which said upper door serves as the principal working surface of the workshop, whereas said lower door serves as a ready storage location upon which a craftsman utilizing the principal working surface can conveniently place relatively small items with which he is working.

3. The portable workshop having a storage mode as well as an active mode as recited in claim 1 in which a sturdy shelf is mounted in a mid portion of the interior of said workshop, said shelf being disposed in approximately an aligned relationship with said upper door when said door is in its open position, thus to make it possible for an item stored on said shelf to be slid onto said door for easy access.

4. The portable workshop having a storage mode as well as an active mode as recited in claim 1 in which a sturdy shelf is mounted in a mid portion of the interior of said workshop, thus to divide the interior of said workshop into upper and lower storage locations.

5. The portable workshop having a storage mode as well as an active mode as recited in claim 4 in which a bottom hinged, laterally extending door is operatively mounted in said rear surface, said door affording ready access to said lower storage location.

6. The portable workshop having a storage mode as well as an active mode as recited in claim 1 in which the combined area of said upper and lower doors represents approximately 80% of the total area of said front surface of said workshop.

7. The portable workshop having a storage mode as well as an active mode as recited in claim 1 in which locking means are utilized in connection with each of said doors.

8. The portable workshop having a storage mode as well as an active mode in which working surfaces are presented for use by a carpenter or other craftsman, said workshop comprising an enclosure defined by a base member, front and rear surfaces, and a pair of end surfaces interconnecting said front and rear surfaces, said base member extending essentially the full width of said front and rear surfaces and forming the principal support for said front and rear surfaces as well as for said end surfaces, and a top surface forming an upper closure for said workshop, being in contact with said upper portions of said front, rear and end surfaces, said front surface being principally constituted by a pair of generally rectangularly-shaped, bottom hinged doors extending essentially the full width of said workshop, with one of said doors being located above the other, connecting means interconnecting said doors, such that said doors open and close together, and means for causing said doors, when opened, to reside in essentially a horizontal attitude, so as to serve as work surfaces for use by the carpenter or other craftsman.

9. The portable workshop having a storage mode as well as an active mode as recited in claim 8 in which the upper of said pair of doors serves as the principal working surface of the workshop, whereas the lower of said pair of doors serves as a ready storage location upon which the craftsman utilizing the principal working surface can conveniently place relatively small items with which he is working.

10. The portable workshop having a storage mode as well as an active mode as recited in claim 8 in which a sturdy shelf is mounted in a mid portion of the interior of said workshop, said shelf being disposed in approximately an aligned relationship with the upper door when said door is in its open position, thus to make it possible for an item stored on said shelf to be slid onto said door for easy access.

11. The portable workshop having a storage mode as well as an active mode as recited in claim 8 in which a sturdy shelf is mounted in a mid portion of the interior of said workshop, thus to divide the interior of said workshop into upper and lower storage locations.

12. The portable workshop having a storage mode as well as an active mode as recited in claim 11 in which a bottom hinged, laterally extending door is operatively mounted in said rear surface, said door positioned to afford ready access to said lower storage location.

13. The portable workshop having a storage mode as well as an active mode as recited in claim 8 in which the combined area of said upper and lower doors represents approximately 80% of the total area of said front surface of said workshop.

14. The portable workshop having a storage mode as well as an active mode as recited in claim 8 in which locking means are utilized in connection with each of said doors.

15. The portable workshop having a storage mode as well as an active mode as recited in claim 8 in which a pair of elongate receptacles of sturdy construction are secured to the underside of said base member, located in the approximate midpoint of the width of said workshop, with said receptacles being disposed in an essentially aligned relationship, each of said receptacles having a principal aperture, with such aperture of one of said elongate receptacles residing in the direction of said front surface of said workshop, and the aperture of the other of said elongate receptacles residing in the direction of said rear surface of said workshop, the principal aperture of each of said receptacles being adapted to removably receive an elongate structural component operatively associated with the support of a respective wheel of relatively large diameter, with a pair of such wheels being intended for support of said workshop during road travel.

16. A portable workshop having a storage mode as well as an active mode in which working surfaces are presented during such active mode for use by a carpenter or other craftsman, said workshop comprising a base member, front and rear surfaces, and a pair of end surfaces interconnecting said front and rear surfaces, said base member extending essentially the full width of said front and rear surfaces and forming the principal support for said front and rear surfaces as well as for said end surfaces, and a weight-bearing top surface forming an upper closure for said workshop so as to define an enclosed space suitable for the storage of tools and the like, said upper closure being in contact with upper portions of said front, rear and end surfaces and forming support means for the mounting of one or more ancillary devices, said front surface being principally constituted by a pair of rectangularly-shaped, bottom hinged doors extending essentially the full width of said workshop, with one of said doors being located above the other, and means for causing said doors, when opened, to reside in essentially a horizontal attitude, so as to serve as work surfaces for the carpenter or other craftsman.

17. The portable workshop having a storage mode as well as an active mode as recited in claim 16 in which said support means for the mounting of one or more ancillary devices involves at least one elongate receptacle of sturdy construction adapted to receive an elongate structural component operatively associated with an ancillary device.

18. The portable workshop having a storage mode as well as an active mode as recited in claim 16 in which an ancillary device may take the form of a worktable of substantial size such that a large blueprint or the like can be opened out and easily read by the craftsman.

19. The portable workshop having a storage mode as well as an active mode as recited in claim 16 in which an ancillary device may take the form of at least two support members mounted in widely spaced locations on said top surface, so as to support hoses, extension cords, or even a number of pieces of pipe or conduit.

20. The portable workshop having a storage mode as well as an active mode as recited in claim 16 in which an ancillary device may take the form of a pair of ladder-like members, one disposed adjacent each end of said upper closure, each of said ladder-like members having a plurality of substantially evenly spaced cross members, enabling elongate pieces of lumber to be stored in a particularly convenient manner.

21. The portable workshop having a storage mode as well as an active mode as recited in claim 16 in which the upper of said doors serves as the principal working surface of the workshop, whereas the lower of said doors serves as a ready storage location upon which a craftsman utilizing the principal working surface can conveniently place relatively small items with which he is working.

22. A portable workshop having a storage mode as well as an active mode in which working surfaces are presented during such active mode for use by a carpenter or other craftsman, said workshop comprising a base member, front and rear surfaces, and a pair of end surfaces interconnecting said front and rear surfaces, said base member extending essentially the full width of said front and rear surfaces and forming the principal support for said front and rear surfaces as well as for said end surfaces, and a top surface forming an upper closure for said workshop so as to define an enclosed space suitable for the storage of tools and the like, said upper closure being in contact with upper portions of said front, rear and end surfaces, said front surface being principally constituted by a pair of rectangularly-shaped, bottom hinged doors extending essentially the full width of said workshop, with one of said doors being located above the other, said upper closure being disposed at an angle to the horizontal and containing thereon a plurality of elongate receptacles of sturdy construction disposed in an essentially parallel relationship, each of said receptacles being adapted to receive an elongate structural component associated with the support of an ancillary device.

23. The portable workshop having a storage mode as well as an active mode as recited in claim 22 in which an ancillary device may take the form of a worktable of substantial size such that a large blueprint or the like can be opened out and easily read by the craftsman.

24. The portable workshop having a storage mode as well as an active mode as recited in claim 22 in which an ancillary device may take the form of at least two support members mounted in widely spaced locations on said top surface, so as to support hoses, extension cords, or even a number of pieces of pipe or conduit.

25. The portable workshop having a storage mode as well as an active mode as recited in claim 22 in which an ancillary device may take the form of a pair of ladder-like members, one disposed adjacent each end of said upper closure, each of said ladder-like members having a plurality of substantially evenly spaced cross members, enabling elongate pieces of lumber of several different sizes to be stored in a particularly convenient manner.

26. A portable workshop having a storage mode as well as an active mode in which working surfaces are presented during such active mode for use by a carpenter or other craftsman, said workshop comprising a base member, front and rear surfaces, and a pair of end surfaces interconnecting said front and rear surfaces, said base member extending essentially the full width of said front and rear surfaces and forming the principal support for said front and rear surfaces as well as for said end surfaces, and a top surface forming an upper closure for said workshop so as to define an enclosed space suitable for the storage of tools and the like, said upper closure being in contact with upper portions of said front, rear and end surfaces, said front surface being principally constituted by a pair of rectangularly-shaped, bottom hinged doors extending essentially the full width of said workshop, with one of said doors being located above the other, at least one of said side surfaces forming a firm support for an outwardly extending shelf member upon which a relatively heavy component can be supported, said shelf member being readily removable from said side surface when not carrying a heavy component.

27. The portable workshop having a storage mode as well as an active mode as recited in claim 26 in which locking means are utilized in connection with each of said doors.

28. The portable workshop having a storage mode as well as an active mode for use by a carpenter or other craftsman, said workshop comprising a base member, front and rear surfaces, and a pair of end surfaces interconnecting said front and rear surfaces, said base member extending essentially the full width of said front and rear surfaces and forming the principal support for said front and rear surfaces as well as for said end surfaces, and a top surface forming an upper closure for said workshop so as to define an enclosed space suitable for the storage of tools and the like, said upper closure being in contact with upper portions of said front, rear and end surfaces, said front surface being principally constituted by a pair of rectangularly-shaped, bottom hinged doors extending essentially the full width of said workshop, with one of said doors being located above the other, a plurality of elongate receptacles of sturdy construction secured to the underside of said base member, with one pair of elongate receptacles being located in the approximate midpoint of the width of said workshop with said receptacles being disposed in an essentially aligned relationship, each of said receptacles having a principal aperture, with such aperture of one of said elongate receptacles residing in the direction of said front surface of said workshop, and the aperture of the other of said elongate receptacles residing in the direction of said rear surface of said workshop, the principal aperture of each of said receptacles being adapted to removably receive an elongate structural component operatively associated with the support of a respective wheel of relatively large diameter, with a pair of such wheels being intended for support of said workshop during road travel.

29. The portable workshop having a storage mode as well as an active mode as defined in claim 28 in which an elongate, towbar-receiving receptacle of sturdy construction is secured to the underside of said base member, with its aperture residing in the direction of one of the end surfaces of said workshop, said towbar-receiving receptacle residing in a perpendicular relationship to said pair of elongate receptacles concerned with the mounting of said wheels of relatively large diameter, said towbar-receiving receptacle being adapted to removably receive a towbar to be used in the transport of said workshop when said wheels of relatively large diameter have been installed.

* * * * *